United States Patent
Baumann

(10) Patent No.: US 10,173,639 B1
(45) Date of Patent: Jan. 8, 2019

(54) SEAT BELT INDICATOR LIGHT

(71) Applicant: Christopher Baumann, Downey, CA (US)

(72) Inventor: Christopher Baumann, Downey, CA (US)

( * ) Notice: Subject to any disclaimer, the term of this patent is extended or adjusted under 35 U.S.C. 154(b) by 0 days.

(21) Appl. No.: 15/641,368

(22) Filed: Jul. 5, 2017

(51) Int. Cl.
*B60R 22/48* (2006.01)

(52) U.S. Cl.
CPC ...... *B60R 22/48* (2013.01); *B60R 2022/4816* (2013.01); *B60R 2022/4875* (2013.01)

(58) Field of Classification Search
CPC ............ B60R 22/48; B60R 2022/4808; B60R 2022/4858; B60R 2022/4866; B60R 2022/4875; B60R 2022/4883; B60R 2022/4891; B60R 2022/4816
See application file for complete search history.

(56) References Cited

U.S. PATENT DOCUMENTS

| | | | |
|---|---|---|---|
| 5,194,910 A * | 3/1993 | Kirkpatrick, Jr. | G01N 21/3151 250/573 |
| 6,059,066 A | 5/2000 | Lary | |
| 6,545,597 B1 | 4/2003 | Blount | |
| 6,774,781 B1 | 8/2004 | Lee | |
| 7,145,448 B2 * | 12/2006 | Tanaka | B60R 22/48 280/728.1 |
| 7,528,709 B1 | 5/2009 | Maggiora | |
| 7,812,716 B1 | 10/2010 | Cotter | |
| 7,828,104 B2 * | 11/2010 | Akaba | B60R 21/013 180/268 |
| 8,220,579 B2 * | 7/2012 | McCoy | B60R 21/00 180/268 |
| D723,200 S | 2/2015 | Shelton | |
| 9,260,054 B1 | 2/2016 | McHomes | |
| 2007/0088488 A1 * | 4/2007 | Reeves | G07C 5/085 701/117 |
| 2012/0088462 A1 * | 4/2012 | Mader | H04M 1/6075 455/161.1 |
| 2012/0242477 A1 | 9/2012 | Rosenblatt | |

FOREIGN PATENT DOCUMENTS

WO  2015150604 A1  10/2015

* cited by examiner

*Primary Examiner* — Van Trieu

(57) ABSTRACT

The seat belt indicator light is a supervisory system monitors a seat belt reminder signal within a vehicle. The seat belt indicator light comprises a visual indicator, a control system, and a communication system. The visual indicator monitors the seat belt reminder signal and illuminates the externally visible signal when the seat belt reminder signal is illuminated. The logic module monitors and logs status of the seat belt reminder signal while the vehicle is in operation. The communication system provides remote and local wireless communication services between the control system and an appropriate authority.

7 Claims, 4 Drawing Sheets

SEAT BELT INDICATOR LIGHT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and vehicles in general, more specifically, a display indicating the correct application of a seat belt.

This disclosure is concerned with signaling devices that are configured for use with vehicles regulated by the United States Department of Transportation. The automobile further comprises a vehicle engine control unit (VECU). The vehicle engine control unit provides DC electrical power that is used for the operation of the lights of the vehicle. The vehicle engine control unit further comprises an electrical ground. The automobile is a commercially available device that falls within the regulatory jurisdiction of the National Highway Transportation Safety Administration within the United States Department of Transportation. For the purposes of this disclosure, the relevant regulatory standards regarding an optical signaling device for an automobile is found within the Federal Motor Vehicle Safety Standard (49CFR571). The Federal Motor Vehicle Safety Standard is commonly abbreviated as FMVSS. The standards contained within the FMVSS are similar to are similar to Canadian motor vehicle standards. Within the FMVSS, section 108 (49CFR571.108) concerns itself with lights and signaling devices associated with the automobile. Within the FMVSS, section 209 (49CFR571.209) concerns itself with seat belts and enhanced seat belt reminder systems. The seat belt refers to a harness assembly within the vehicle that is intended to secure a passenger to a seat within the vehicle.

SUMMARY OF INVENTION

The seat belt indicator light is a supervisory system that is configured for use with a vehicle. The seat belt indicator light monitors seat belt usage within a vehicle. Within this disclosure, the term vehicle is refers to a vehicle that is under the regulatory jurisdiction of the National Highway Transportation Safety Administration within the United States Department of Transportation. The vehicle is further defined with a vehicle engine control unit. The vehicle engine control unit is further defined with a seat belt reminder signal. The seat belt reminder signal is generated by an enhanced seat belt reminder system that is managed by the vehicle engine control unit. The seat belt reminder signal is an electrical signal that may be interpreted as indicating that the vehicle is being operated with an inappropriate configuration of one or more of the seat belts within the vehicle. Typically, it may be assumed that the vehicle is in motion with a passenger that is not appropriately secured by a seat belt. Other, less typical, scenarios can also generate the seat belt reminder signal. The seat belt indicator light: 1) monitors and logs the status of the seat belt reminder signal during the operation of the vehicle; 2) illuminates a signal visible from the exterior of the vehicle should the seat belt reminder signal be generated while the vehicle is operating; 3) provide remote and local access to the logs generated in item 1). The seat belt indicator light comprises a visual indicator, a control system, and a communication system. The visual indicator monitors the seat belt reminder signal and illuminates the externally visible signal when the seat belt reminder signal is illuminated. The logic module monitors and logs status of the seat belt reminder signal while the vehicle is in operation. The communication system provides remote and local wireless communication services between the control system and an appropriate authority.

These together with additional objects, features and advantages of the seat belt indicator light will be readily apparent to those of ordinary skill in the art upon reading the following detailed description of the presently preferred, but nonetheless illustrative, embodiments when taken in conjunction with the accompanying drawings.

In this respect, before explaining the current embodiments of the seat belt indicator light in detail, it is to be understood that the seat belt indicator light is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the seat belt indicator light.

It is therefore important that the claims be regarded as including such equivalent construction insofar as they do not depart from the spirit and scope of the seat belt indicator light. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
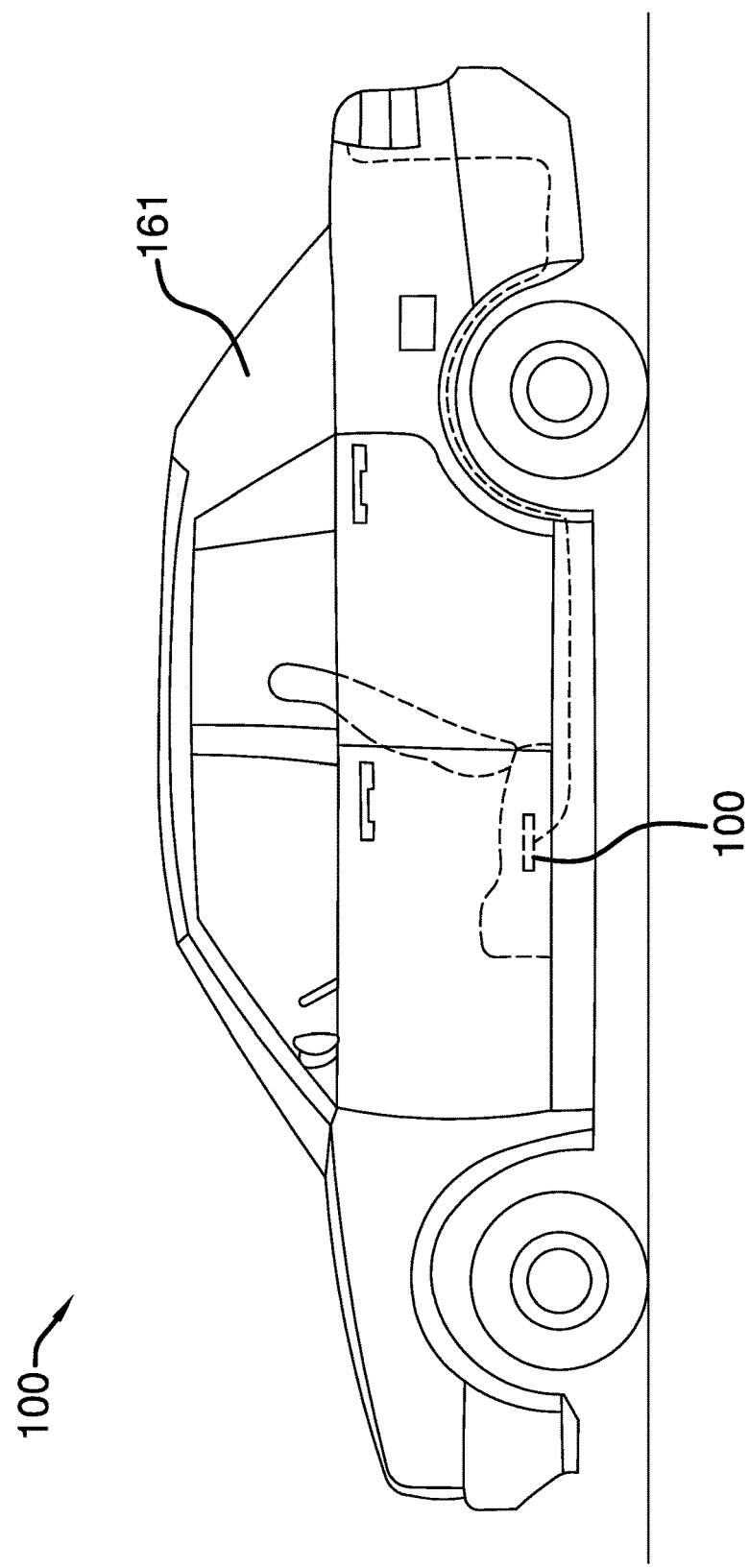
FIG. 1 is a side view of an embodiment of the disclosure.
Figure 2:
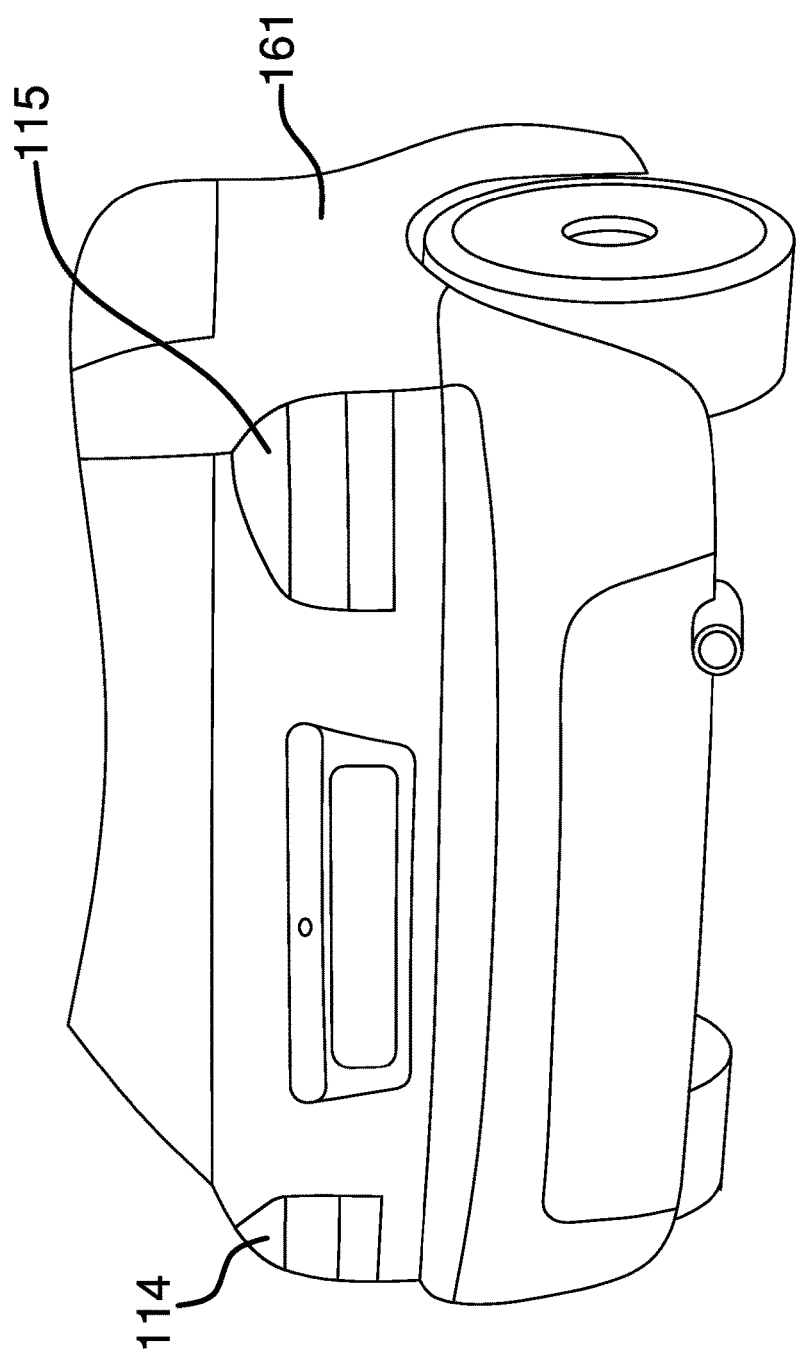
FIG. 2 is a rear perspective view of an embodiment of the disclosure.
Figure 3:
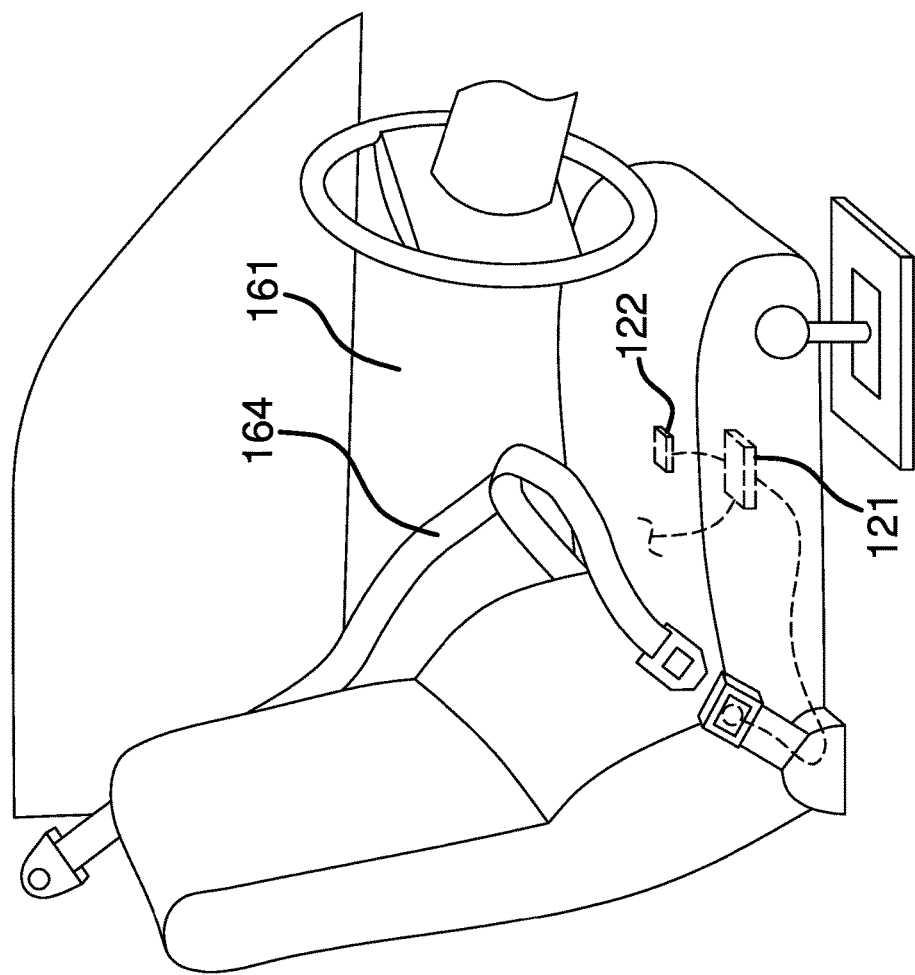
FIG. 3 is an internal view of an embodiment of the disclosure.
Figure 4:
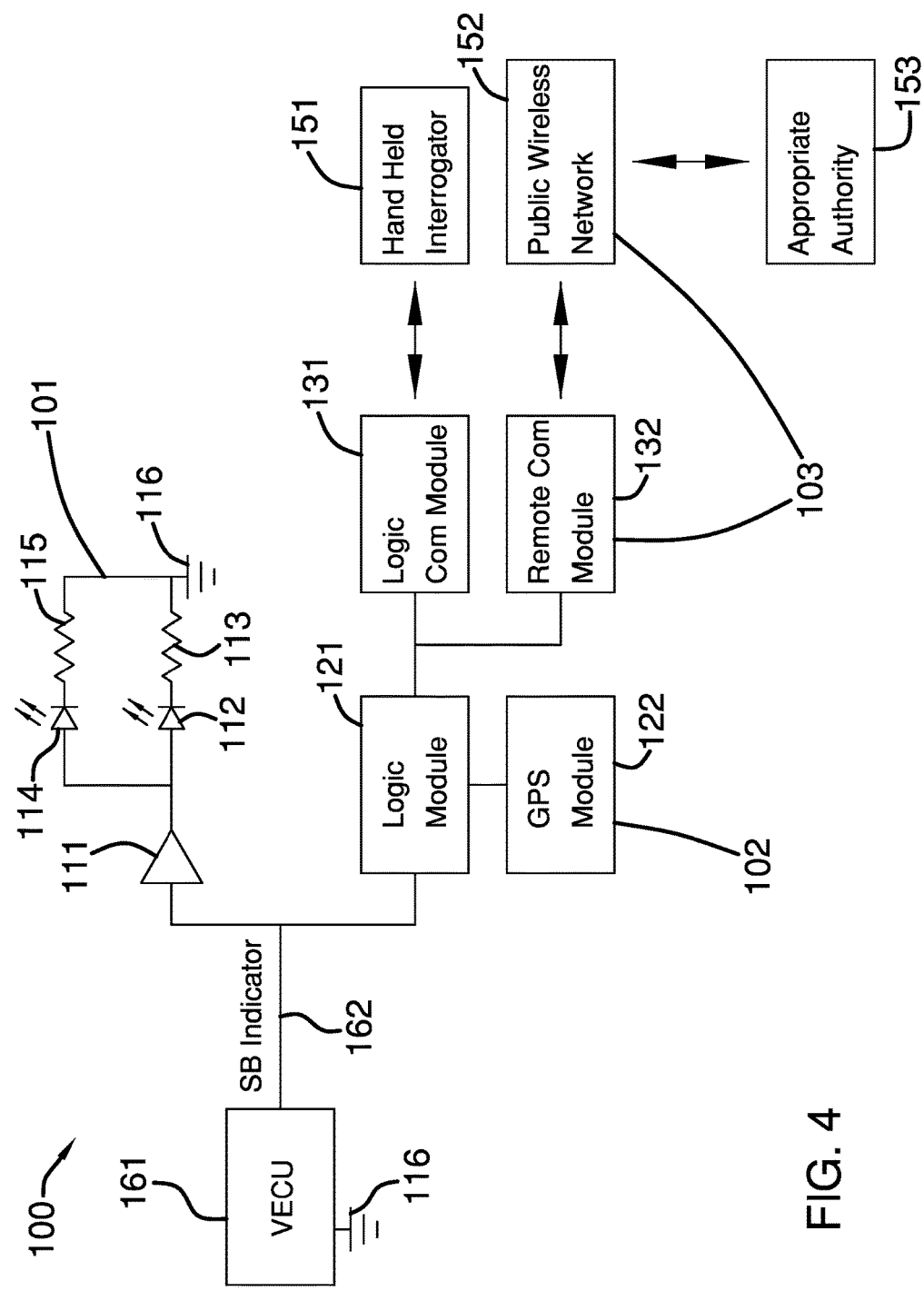
FIG. 4 is a block diagram or schematic view of an embodiment of the disclosure.

Detailed reference will now be made to one or more potential embodiments of the disclosure, which are illustrated in FIGS. 1 through 4.

The seat belt indicator light 100 (hereinafter invention) is a supervisory system that is configured for use with a vehicle 161. The invention 100 monitors seat belt 164 usage within a vehicle 161. Within this disclosure, the term vehicle is refers to a vehicle 161 that is under the regulatory jurisdiction of the National Highway Transportation Safety Administration within the United States Department of Transportation. The vehicle 161 is further defined with a vehicle 161 engine control unit 162 and a seat belt 164. The vehicle 161 engine control unit 162 is further defined with a seat belt 164 reminder signal 163. The seat belt 164 reminder signal 163 refers to an electrical signal that is generated by the vehicle 161 engine control unit 162 to indicate that at least one seat belt 164 in the vehicle 161 is improperly configured. The seat belt 164 reminder signal 163 is generated by an enhanced seat belt 164 reminder system that is managed by the vehicle 161 engine control unit 162. The seat belt 164 reminder signal 163 is an electrical signal that may be interpreted as indicating that the vehicle 161 is being operated with an inappropriate configuration of one or more of the seat belts 164 within the vehicle 161. Typically, it may be assumed that the vehicle 161 is in motion with a passenger that is not appropriately secured by a seat belt 164. Other, less typical, scenarios can also generate the seat belt 164 reminder signal 163. The invention 100: 1) monitors and logs the status of the seat belt 164 reminder signal 163 during the operation of the vehicle 161; 2) illuminates a signal visible from the exterior of the vehicle 161 should the seat belt 164 reminder signal 163 be generated while the vehicle 161 is operating; 3) provides remote and local access to the logs generated in item 1).

The invention 100 comprises a visual indicator 101, a control system 102, and a communication system 103. The visual indicator 101 monitors the seat belt 164 reminder signal 163 and illuminates an externally visible signal when the seat belt 164 reminder signal 163 is illuminated. The control system 102 monitors and logs the status of the seat belt 164 reminder signal 163 while the vehicle 161 is in operation. The communication system 103 provides remote and local wireless communication services between the control system 102 and an appropriate authority 153.

The visual indicator 101 comprises two signal lamps that are visible from the exterior of the vehicle 161. The visual indicator 101 is powered using the vehicle 161 engine control unit 162. The visual indicator 101 automatically illuminates when the vehicle 161 is operating with an improperly configured seat belt 164. The visual indicator 101 is used to draw the attention of an appropriate authority 153 while the vehicle 161 is in operation. The operation of the visual indicator 101 is triggered by the seat belt 164 reminder signal 163. The visual indicator 101 comprises an amplifier 111, a left LED 112, a left limit resistor 113, a right LED 114, a right limit resistor 115, and an electrical ground 116.

The amplifier 111 is a commercially available electrical device that: 1) amplifies the seat belt 164 reminder signal 163 in order to drive the left LED 112; 2) electrically buffers the left LED 112 from the vehicle 161 engine control unit 162 which generates the seat belt 164 reminder signal 163; 3) amplifies the seat belt 164 reminder signal 163 in order to drive the right LED 114; and, 4) electrically buffers the right LED 114 from the vehicle 161 engine control unit 162 which generates the seat belt 164 reminder signal 163.

The left LED 112 comprises one or more LEDs. The left LED provides half the exterior illumination provided by the visual indicator 101. The left LED 112 is mounted above the left rear lighting assembly of the vehicle 161. It is preferred that the illumination provided by the left LED 112 be provided by an LED for reliability purposes. It is preferred that the LEDs used in the left LED 112 generate illumination in the range of 430 to 470 nM. The left limit resistor 113 is an electrical device that is placed in series between the left LED 112 and the electrical ground 116. The left limit resistor 113 limits current flow through the left LED 112.

The right LED 114 comprises one or more LEDs. The right LED 114 provides half the exterior illumination provided by the visual indicator 101. The right LED 114 is mounted above the right rear lighting assembly of the vehicle 161. It is preferred that the illumination provided by the right LED 114 be provided by an LED for reliability purposes. It is preferred that the LEDs used in the right LED 114 generate illumination in the range of 430 to 470 nM. The right limit resistor 115 is an electrical device that is placed in series between the right LED and the electrical ground 116. The right limit resistor 115 limits current flow through the right LED 114.

The electrical ground 116 is a reference voltage that is used throughout the invention 100. In the first potential embodiment of the disclosure, it is anticipated that the electrical ground 116 of the invention 100 will share the same voltage potential as the electrical ground of the vehicle 161 engine control unit 162.

The control system 102 is an electrical device that: 1) monitors the status of the seat belt 164 reminder signal 163; 2) maintains a log of the status of the seat belt 164 reminder signal 163 over a previously determined period of time; and, 3) transmits the maintained logs to an appropriate authority 153 upon the request of the appropriate authority 153. The control system 102 further controls the operation of the communication system 103. The control system 102 and the communication system 103 are powered using the vehicle 161 engine control unit 162. The control system 102 comprises a logic module 121 and a GPS module 122.

The logic module 121 is a readily and commercially available programmable electronic device that is used to manage, regulate, and operate the control system 102 and the communication system 103. Depending on the specific design and the selected components, the logic module 121 can be a separate component within the control system 102 or the functions of the logic module 121 can be incorporated into another component such as the vehicle 161 engine control unit 162.

The GPS module 122 is an electrical device that communicates with the GPS to determine the GPS coordinates of the GPS module 122. When queried by the logic module 121, the GPS module 122 transfers the GPS coordinates to the logic module 121.

The communication system 103 is used to wirelessly transmit the maintained logs to an appropriate authority 153. The communication system 103 operates in a local and remote mode. The local mode allows for the transfer of the maintained logs by the control system 102 to the appropriate authority 153 when the appropriate authority 153 is in the presence of the vehicle 161. The local mode of the communication system 103 is intended to support inspection based activities of the appropriate authority 153 such as traffic stops or checkpoint activities.

The remote mode of the communication system 103 allows for the transfer of the maintained logs to a central facility maintained by the appropriate authority 153 in a manner that does not require the physical presence of the vehicle 161. The remote mode of the communication system 103 allows the appropriate authority 153 to survey the maintained logs downloaded from any vehicle 161 within its jurisdiction for purposes such as: 1) determining seat belt 164 usage rates within the population; or, 2) performing individual surveillance audits of seat belt 164 to maintain seat belt 164 discipline within a population The communication system 103 comprises a local communication module 131 and a remote communication module 132.

The local communication module 131 is a wireless electronic communication device that allows the logic module 121 to wirelessly communicate with a handheld interrogator 151 that is locally presented by an appropriate authority 153. In one potential usages scenario of the local communication module 131, it is anticipated that a handheld interrogator 151 is used by a local law enforcement official to call up the logs maintained by the logic module 121 for inspection. In the first potential embodiment of the disclosure the local communication module 131 supports a communication protocol selected from the group consisting of a WiFi protocol or a Bluetooth protocol.

The handheld interrogator 151 is a personal data device that is carried by an appropriate authority 153. The handheld interrogator 151 is configured with an app that allows the handheld interrogator 151 to make a request to the logic module 121 through the local communication module 131 for the download of the maintained logs to the handheld interrogator 151.

The remote communication module 132 communicates SMS and MMS messages between the logic module 121 and the appropriate authority 153 through a commercially provided and publicly available cellular wireless network 152. The use of a commercially provided and publicly available cellular wireless network 152 is preferred because: 1) of its low cost; 2) of the widespread availability and the broad interoperability between competing commercially provided and publicly available cellular wireless networks 152; and, 3) methods and techniques to send SMS and MMS messages over a commercially provided and publicly available cellular wireless network 152 are well known and documented by those skilled in the electrical arts. Although there can be exceptions, in general, the commercially provided and publicly available cellular wireless network 152 refers to what is commonly called a cellular network provider.

The operation of the invention 100 is discussed in the following 3 paragraphs.

The invention 100 is in operation whenever power is applied to the seat belt 164 reminder signal 163. While the invention 100 is powered, the logic module 121 monitors the status of the seat belt 164 reminder signal 163. While the invention 100 is powered, the amplifier 111 is electrically connected to the seat belt 164 reminder signal 163 such that the seat belt 164 reminder signal 163 will trigger the amplifier 111. When the seat belt 164 reminder signal 163 is activated, the amplifier amplifies the seat belt 164 reminder signal 163 such that the left LED 112 and the right LED 114 are illuminated. When the seat belt 164 reminder signal 163 is activated, the logic module 121 queries the GPS module 122 for the GPS coordinates of the vehicle 161. The logic module 121 then records the date, time, and the GPS coordinates of the vehicle 161 at the time that the seat belt 164 reminder signal 163 occurred into the maintained log.

When the seat belt 164 reminder signal 163 is deactivated, the logic module 121 queries the GPS module 122 for the GPS coordinates of the vehicle 161. The logic module 121 then records the date, time, and the GPS coordinates of the vehicle 161 at the time that the seat belt 164 reminder signal 163 discontinued into the maintained log. When the seat belt 164 reminder signal 163 is deactivated, the amplifier 111 extinguisher the left LED 112 and the right LED 114.

The logic module 121 further monitors the communication system 103 for a request for the maintained logs. Should the logic module 121 receive a request for the maintained logs, the logic module 121 will transmit the maintained logs to the appropriate authority 153 using a communication module selected from the group consisting of the local communication module 131 and the remote communication module 132. The selected communication module is the communication module that received the request from the appropriate authority 153.

The following definitions were used in this disclosure:

Amplifier: As used in this disclosure, an amplifier refers to an electronic component that increases voltage, current, or power of an input signal. Specifically, within this disclosure, an amplifier refers to a differential amplifier. A differential amplifier is a device two input electrical device with a single output. A difference amplifier amplifies the voltage difference between the two inputs.

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to receive alarm or other notification messages regarding a monitored system or activity.

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Bluetooth: As used in this disclosure, Bluetooth is a standardized communication protocol that is used to wirelessly interconnect electronic devices.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Electrical Ground: As used in this disclosure, an electrical ground is a common reference voltage that is used in the design and implementation of electrical circuits. An electrical ground is often, but not necessarily, the discharge point of electric currents flowing through an electric circuit.

FMVSS: As used in this disclosure, FMVSS is an abbreviation for Federal Motor Vehicle Safety Standard.

GPS: As used in this disclosure, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Handheld: As used in this disclosure, when referring to an item or device, handheld means that the item or device is small and light enough to be operated while a person holds the item or device in their hands.

LED: As used in this disclosure, an LED is an acronym for a light emitting diode. A light emitting diode is a diode that is also a light source.

Light: As used in this disclosure, a light is an electrical device that generates visible light to illuminate objects so they can be seen.

Limit Resistor: As used in this disclosure, a limit resistor is an electrical resistor that is used to limit the flow of electric current through an electrical circuit.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Personal Data Device: As used in this disclosure, a personal data device is a handheld device that is used for managing personal information and communication. Examples of personal data device include, but are not limited to, cellular phones, tablets and smart phones.

Seat Belt: As used in this disclosure, a seat belt refers to a harness system commonly used in aircraft and land vehicles such as automobiles, which secures a person into a seat.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a motorized vehicle is a device that is used for transporting passengers, goods, or equipment. The term motorized vehicle refers to a vehicle can move under power provided by an electric motor or an internal combustion engine.

WiFi: As used in this disclosure, WiFi refers to the physical implementation of a collection of wireless electronic communication standards commonly referred to as IEEE 802.11x.

Wireless: As used in this disclosure, wireless is an adjective that is used to describe a communication channel between two terminals that does not require the use of physical cabling.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A monitoring device comprising:
a visual indicator, a control system, and a communication system;
wherein the visual indicator, the control system, and the communication system are electrically interconnected;
wherein the monitoring device is configured for use with a vehicle;
wherein the monitoring device monitors seat belt usage within a vehicle;
wherein the vehicle is further defined with a vehicle engine control unit and a seat belt;
wherein the vehicle engine control unit is further defined with a seat belt reminder signal;
wherein the seat belt reminder signal is an electrical signal that is generated by the vehicle engine control unit;
wherein the monitoring device monitors and logs the status of the seat belt reminder signal during the operation of the vehicle;
wherein the monitoring device records the status of the seat belt reminder signal in a maintained log;
wherein the monitoring device illuminates a signal that is visible from the exterior of the vehicle when the seat belt reminder signal be generated while the vehicle is operating;
wherein the monitoring device provides remote and local access to the maintained logs;
wherein the visual indicator monitors the seat belt reminder signal and illuminates the externally visible signal when the seat belt reminder signal is generated;
wherein the visual indicator is powered using the vehicle engine control unit;
wherein the operation of the visual indicator is triggered by the seat belt reminder signal;
wherein the control monitors and logs the status of the seat belt reminder signal while the vehicle is in operation;
wherein the communication system provides remote and local wireless communication services between the control system and an appropriate authority;
wherein the visual indicator comprises an amplifier, a left LED, a left limit resistor, a right LED, a right limit resistor, and an electrical ground;
wherein the amplifier, the left LED, the left limit resistor, the right LED, the right limit resistor, and the electrical ground are electrically interconnected;
wherein the amplifier is electrically connected to the seat belt reminder system;
wherein the amplifier is an electrical device;
wherein the amplifier amplifies the seat belt reminder signal in order to drive the left LED;
wherein the amplifier amplifies the seat belt reminder signal in order to drive the right LED;
wherein the left LED comprises one or more LEDs;
wherein the left LED provides half the exterior illumination provided by the visual indicator;

wherein the left LED is mounted on the rear of the vehicle;
wherein the right LED comprises one or more LEDs;
wherein the right LED provides half the exterior illumination provided by the visual indicator;
wherein the right LED is mounted on the rear of the vehicle;
wherein the control system is an electrical device;
wherein the control system monitors the status of the seat belt reminder signal;
wherein the control system maintains a log of the status of the seat belt reminder signal over a previously determined period of time;
wherein the control system transmits the maintained logs to an appropriate authority upon the request of the appropriate authority;
wherein the control system controls the operation of the communication system;
wherein the control system and the communication system are powered using the vehicle engine control unit;
wherein the control system comprises a logic module and a GPS module;
wherein the logic module is a programmable electronic device;
wherein the logic module is electrically connected to the GPS module;
wherein the logic module is electrically connected to the communication system;
wherein the GPS module is an electrical device that communicates with the GPS to determine the GPS coordinates of the GPS module;
wherein when queried by the logic module, the GPS module transfers the GPS coordinates to the logic module;
wherein the communication system wirelessly transmits the maintained logs to an appropriate authority;
wherein the communication system operates in a local and remote mode;
wherein the local mode allows for the transfer of the maintained logs by the control system to the appropriate authority when the appropriate authority is in the presence of the vehicle;
wherein the remote mode of the communication system allows for the transfer of the maintained logs to a central facility maintained by the appropriate authority in a manner that does not require the physical presence of the vehicle;
wherein the communication system comprises a local communication module and a remote communication module;
wherein the local communication module operates the local mode of the communication system;
wherein the remote communication module operates the remote mode of the communication system;
wherein the local communication module electrically connects to the logic module;
wherein the remote communication module electrically connects to the logic module;
wherein the local communication module is a wireless electronic communication device;
wherein the local communication module wirelessly communicates with a handheld interrogator that is locally presented by an appropriate authority;
wherein the handheld interrogator is a personal data device that is carried by an appropriate authority;
wherein the handheld interrogator is configured to allow the handheld interrogator to make a request to the logic module through the local communication module for the download of the maintained logs to the handheld interrogator.

2. The monitoring device according to claim 1
wherein the remote communication module exchanges a plurality of SMS messages between the logic module and the appropriate authority;
wherein the plurality of SMS messages are exchanged through a commercially provided and publicly available cellular wireless network.

3. The monitoring device according to claim 2
wherein the amplifier is electrically connected to the seat belt reminder signal such that the seat belt reminder signal will trigger the amplifier;
wherein when the seat belt reminder signal is activated, the amplifier amplifies the seat belt reminder signal such that the left LED and the right LED are illuminated;
wherein when the seat belt reminder signal is deactivated, the amplifier extinguisher the left LED and the right LED.

4. The monitoring device according to claim 3
wherein the logic module is electrically connected to the seat belt reminder signal such that the seat belt reminder signal will trigger the amplifier;
wherein when the seat belt reminder signal is generated the logic module queries the GPS module for the GPS coordinates of the vehicle;
wherein the logic module then records the date, time, and the GPS coordinates of the vehicle at the time that the seat belt reminder signal occurred into the maintained log;
wherein when the seat belt reminder signal is deactivated, the logic module queries the GPS module for the GPS coordinates of the vehicle;
wherein the logic module then records the date, time, and the GPS coordinates of the vehicle at the time that the seat belt reminder signal discontinued into the maintained log.

5. The monitoring device according to claim 4
wherein the logic module further monitors the communication system for a request for the maintained logs;
wherein should the logic module receive a request for the maintained logs, the logic module will transmit the maintained logs to the appropriate authority using a communication module selected from the group consisting of the local communication module and the remote communication module;
wherein the selected communication module is the communication module that received the request from the appropriate authority.

6. The monitoring device according to claim 5
wherein the left limit resistor is an electrical device that is placed in series between the left LED and the electrical ground;
wherein the right limit resistor is an electrical device that is placed in series between the right LED and the electrical ground.

7. The monitoring device according to claim 6
wherein the LEDs used in the left LED generate illumination in the range of 430 to 470 nM;
wherein the LEDs used in the right LED generate illumination in the range of 430 to 470 nM.

* * * * *